July 23, 1946.  T. S. DONNELLY, JR  2,404,437
ELECTRODE HOLDER
Original Filed Feb. 19, 1943

INVENTOR.
THOS. S. DONNELLY, JR.
BY
HIS ATTORNEY

Patented July 23, 1946

2,404,437

UNITED STATES PATENT OFFICE 2,404,437

ELECTRODE HOLDER

Thomas S. Donnelly, Jr., Detroit, Mich., assignor to Bordon Mfg. Co., Inc., Detroit, Mich., a corporation of Michigan Original application February 19, 1943, Serial No. 476,481, now Patent No. 2,358,220, dated September 12, 1944. Divided and this application December 11, 1943, Serial No. 513,946

3 Claims. (Cl. 219—8)

This application constitutes a division of my copending application Serial No. 476,481, filed February 19, 1943, on an electrode holder, now Patent No. 2,358,220 dated September 12, 1944.

This invention relates to a new and useful improvement in an electrode holder adapted for use in arc welding operations. In the use of such holders gripping jaws are used for gripping an electrode. It is customary to construct these jaws so that the electrode may be gripped between the jaws and extended outwardly therefrom at various angles. This is usually accomplished by forming on the gripping faces of the jaws grooves extended diagonally to the length of the jaws. This arrangement, however, limits the angles at which the electrode may be extended.

It is an object of the present invention to provide an electrode holder so constructed and arranged that the gripping portion thereof may be easily and quickly moved angularly to the handle to extend at various angles relatively thereto so that the angle of extension of the electrode may be changed without releasing it by the gripping members.

Another object of the invention is the provision of an electrode holder having an electrode gripping portion and a handle swingably connected together and provided with means whereby these parts may be secured in substantially fixed relation at various angles of relative swinging movement.

Another object of the invention is the provision of an electrode holder having a cable connector and an electrode gripping portion swingably connected together and provided with a flexible conductor whereby the cable connector and the gripping portion of the electrode holder may be electrically connected so as to eliminate arcing at the point of pivotal connection of these parts.

Another object of the invention is the provision in an electrode holder of a gripping jaw detachably mounted on a supporting member in such a manner that it may be easily and quickly removed and replaced.

Other objects will appear hereinafter.

It is recognized that various modifications and changes may be made in the detail of structure illustrated without departing from the invention and it is intended that such changes shall be embraced within the claims forming a part hereof.

Forming a part of this application is a drawing in which.

Figure 1:
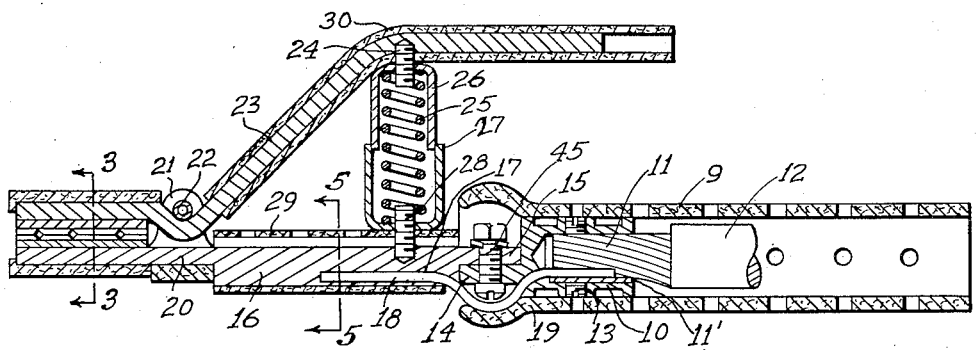
Fig. 1 is a longitudinal central vertical sectional view of an electrode holder embodying the invention.

In the drawing, I have shown an electrode holder embodying a handle 9 in which is mounted a barrel or cable connector 10 in which the bared end 11 of an electric conductor 12 may be secured by set screws 13 or in any other suitable manner. Projecting forwardly from the barrel or cable connector is a tongue 14 on which is adapted to engage a tongue 15 formed on the supporting bar 16. Formed on the under face of the supporting bar 16 is a groove 17 in which is secured one end of a flexible electric connector such as a cable of fine strands. This cable 18 is led through an opening 19 formed in the barrel or cable connector 10 and lies against the bared portion 11 of the cable, a presser plate 11' being pressed by the screw 13 against the cable 18. This cable 18 is of sufficient capacity so that the current desired to be delivered to the electrode used may pass therethrough without excessive heating and in such a manner as to eliminate arcing between the parts 14 and 15.

The supporting prong 16 is provided at its forward end with a rib-like structure 20 projecting upwardly from which are lugs 21 through which extend a pivot pin 22 whereby the handle 23 is pivotally mounted thereon. This handle 23 carries a stud 24 which projects into the fiber cup 26 embracing the coil spring 25. This fiber cup 26 telescopes with the fiber cup 27 into which projects the stud 28 carried by the prong 16. A covering 29 of fiber or other suitable insulating material covers the prong 16 and a similar cover of fiber 30 covers the handle 23.

Figures 3, 4:
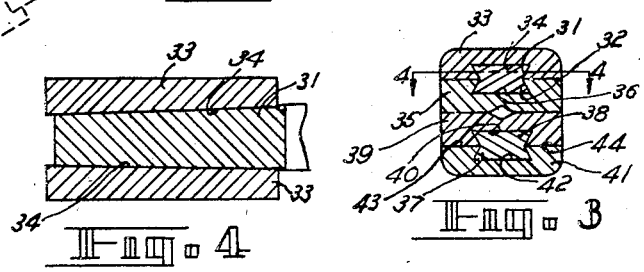
Fig. 3 is a sectional view taken on line 3—3 of Fig. 1.
Fig. 4 is a sectional view taken on line 4—4 of Fig. 3.
Figure 5:
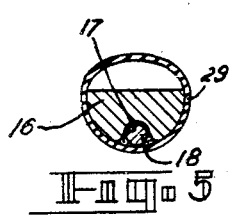
Fig. 5 is a sectional view taken on line 5—5 of Fig. 1.

The forward end of the handle 23 is formed in cross-section as shown in Fig. 3 so as to embody oppositely facing dove-tailed portions 31 and 32. An insulating plate 33 is provided with a longitudinally extending groove 34 and is slid onto the forward end of the handle 23 so as to protect it against the heat and against contact with "live" bodies. A removable gripping jaw 35 is provided with a dove-tailed groove 36 and slipped onto the dove-tailed portion 32.

The portion 20 is formed in cross-section as shown in Fig. 3 to provide the dove-tailed portion 38. A removable gripping jaw 39 is provided with the longitudinally extending dove-tailed groove 40 and slipped onto the portion 38 so that the jaws 35 and 39 may cooperate to grip an electrode therebetween. An insulating plate 41 formed from fiber or other suitable material is provided with a dove-tailed groove 42 and slipped onto the dove-tailed portion 37.

It will be noted that the insulation plates above and below and the detachable jaws above and below are substantially duplicates of each other and are mounted in substantially the same manner. It will be noted from Fig. 4 that the dove-tailed portions 31, 32, 38 and 37 taper lengthwise so that as the insulation plates on the jaws are driven on, a binding press fit is obtained. It will also be noted that the opposed face of the insulation plate 41, as indicated at 43, bears against the opposed face 44 of the jaw 39 and this engagement of the opposed faces of the jaws and the cooperating insulating plate is such as to bind both of these members on the dove-tailed portion on which they are slid.

This construction makes it possible to remove and replace the jaws when they become worn or burned out. It also makes it possible to remove and replace the insulation plates when they become worn or burned out. Experience has shown that the insulation plates will not last as long as the jaws and that consequently they are in a condition requiring replacement much sooner than are the jaws. When the insulation has been burned away so that the jaws are exposed and liable to contact with live bodies, the insulation plates should be removed and replaced, as otherwise the jaws may be brought into contact with live bodies and burned or damaged.

Experience has shown, however, that the operators will not replace or have replaced the insulation plates when they become worn, with the result that the jaws are subjected to unnecessary wear and abuse. Due to the fact that the insulation plates serve to bind the jaws on the dove-tailed portion and the jaws serve to bind the insulation plates, the operator will be more particular in replacing the insulation plates when they become worn. This is due to the fact that when the insulation plates become worn, the jaws will become loose on the supporting dove-tailed portion.

Figure 2:
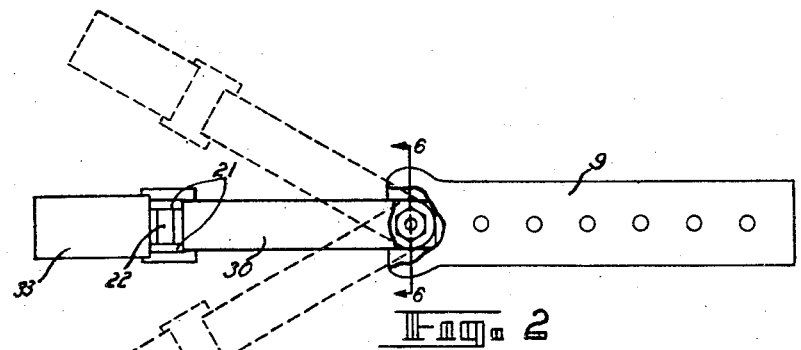
Fig. 2 is a top plan view of an electrode holder embodying the invention.

A bolt 45 is projected through the tongues 14 and 15 to pivotally secure these parts together. The bolt is provided with a nut 46 which presses against the spring washer 47. One of the tongues is provided with recesses 48 in which engage the spaced-apart bosses 49. Consequently, the prong 16 and parts carried thereby may be swung relatively to the handle 9 to various positions of inclination, as indicated in dotted lines in Fig. 2. When this swinging strain is exerted on the member 16, the bosses 49 will ride out of the recesses 48 against the compression of the spring 47, and when rotated into registration with the next recess, the bosses 49 will snap into the recesses. This makes it possible for the operator to have the electrode projecting straight out from the jaws and yet extend the electrode angularly of the handle 9 at the desired angularity.

Figures 7, 8:
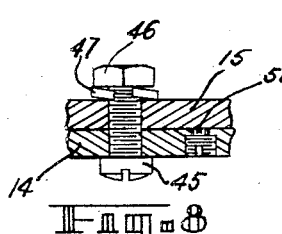
Fig. 7 is a fragmentary plan view showing the inner face of a part of the invention.
Fig. 8 is a fragmentary sectional view similar to Fig. 6 showing a slight modification.
Figure 6:
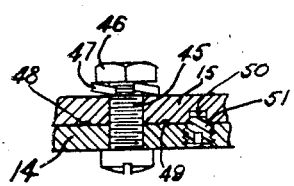
Fig. 6 is a fragmentary sectional view taken on line 6—6 of Fig. 2.

By threading the set screw 51 into the recess 50, the tongues 14 and 15 may be located in any desired position, these recesses 50 being spaced apart and extended in an arc. In Fig. 8, I have shown the screw 51 serving as a set screw bearing against the tongue 15, the recess 50 being eliminated. This permits the locating of the prong 16 and the handle 19 at any degree of swingable movement.

What I claim as new is:

1. In an electrode holder of the class described, a metallic gripping mechanism for gripping an electrode; a metallic supporting member for said gripping mechanism and extending rearwardly thereof; a handle; a metallic connector mounted in said handle for connection to an electric conductor; means for pivotally connecting said supporting member and said connector; and a flexible electric conducting member connecting said supporting member and said connector and shunting the pivotal connection.

2. In an electrode holder of the class described, a metallic electrode gripping mechanism; a handle; a metallic connecting member mounted in said handle for connection to an electric conductor; a metallic supporting member mounted on and extending rearwardly of said gripping mechanism; means for pivotally connecting said supporting member and said connector, said supporting member being swingable on its pivot to various angles of inclination relatively to said handle; and a flexible electrical connector connecting said supporting member and said connector.

3. In an electrode holder of the class described, a metallic electrode gripping mechanism; a handle; a metallic cable connector mounted in said handle and adapted for attachment to an electric conductor; a metallic supporting member mounted on and extending rearwardly of said gripping mechanism; means for pivotally connecting said supporting member and said connector, said supporting member being swingable to various angles of inclination to the axis of said handle; means for resisting the swinging of said supporting member from one angle of inclination to another; and a flexible electrical conducting member electrically connecting said supporting member with a cable connected to said cable connector and shunting the point of pivot.

THOMAS S. DONNELLY, JR.